United States Patent
Bauco et al.

(10) Patent No.: US 10,379,309 B2
(45) Date of Patent: Aug. 13, 2019

(54) TRACEABLE OPTICAL FIBER CABLE AND FILTERED VIEWING DEVICE FOR ENHANCED TRACEABILITY

(71) Applicant: CORNING OPTICAL COMMUNICATIONS LLC, Hickory, NC (US)

(72) Inventors: Anthony Sebastian Bauco, Horseheads, NY (US); Douglas Llewellyn Butler, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/939,488

(22) Filed: Nov. 12, 2015

(65) Prior Publication Data
US 2016/0139353 A1    May 19, 2016

Related U.S. Application Data

(60) Provisional application No. 62/081,054, filed on Nov. 18, 2014.

(51) Int. Cl.
G02B 6/44    (2006.01)
G02B 27/02   (2006.01)
(Continued)

(52) U.S. Cl.
CPC .............. G02B 6/447 (2013.01); F21V 9/00 (2013.01); F21V 33/00 (2013.01); G01M 11/35 (2013.01);
(Continued)

(58) Field of Classification Search
CPC .... G02B 6/447; G02B 27/022; G02B 6/4482; G02B 6/3895; G02B 6/001; F21V 9/00;
(Continued)

(56) References Cited

U.S. PATENT DOCUMENTS 3,942,859 A    3/1976    Korodi
4,412,936 A    11/1983   Khmelkov et al.
(Continued)

FOREIGN PATENT DOCUMENTS

CN    200941319 Y    8/2007
CN    201419706 Y    3/2010
(Continued)

OTHER PUBLICATIONS

Espacenet English machine translation of Rund et al. (DE 10239602 B3, cited in IDS of Jun. 8, 2016).*
(Continued)

*Primary Examiner* — Mohamed K Amara
(74) *Attorney, Agent, or Firm* — Adam R. Weeks

(57) ABSTRACT

A system and method for tracing an optical communication cable and related traceable fiber optic cable are provided. The system includes a traceable optical communication cable that includes an elongate light emitting element extending along at least a portion of the length of the cable body configured to emit light radially outward from the cable body, and the light emitted from the light emitting element has a wavelength range. The cable body includes a plurality of spaced light transmitting windows separated from each other by a plurality of opaque fire-resistant sections. The system includes a viewing device having a light filtering element configured to pass light within the wavelength length range through the light filtering element and to block at least a portion of light having wavelengths outside of the wavelength range.

23 Claims, 5 Drawing Sheets

(51) Int. Cl.
*F21V 9/00* (2018.01)
*F21V 33/00* (2006.01)
*G01M 11/00* (2006.01)
*F21V 8/00* (2006.01)
*G02B 6/38* (2006.01)
*F21Y 103/00* (2016.01)
*F21Y 115/20* (2016.01)

(52) U.S. Cl.
CPC ........ *G02B 27/022* (2013.01); *F21Y 2103/00* (2013.01); *F21Y 2115/20* (2016.08); *G02B 6/001* (2013.01); *G02B 6/3895* (2013.01); *G02B 6/4482* (2013.01)

(58) Field of Classification Search
CPC ..... F21V 33/00; G01M 11/35; F21Y 2103/00; F21Y 2115/20
See application file for complete search history.

(56) References Cited

U.S. PATENT DOCUMENTS

| | | | |
|---|---|---|---|
| 4,466,697 A | 8/1984 | Daniel | |
| 4,557,552 A | 12/1985 | Newton et al. | |
| 4,637,686 A | 1/1987 | Iwamoto et al. | |
| 4,712,858 A | 12/1987 | Presby | |
| 4,755,018 A | 7/1988 | Heng et al. | |
| 4,763,984 A | 8/1988 | Awai et al. | |
| 4,923,274 A | 5/1990 | Dean | |
| 4,995,691 A | 2/1991 | Purcell, Jr. | |
| 5,006,806 A | 4/1991 | Rippingale et al. | |
| 5,017,873 A | 5/1991 | Rippingale et al. | |
| 5,040,867 A | 8/1991 | de Jong et al. | |
| 5,122,750 A | 6/1992 | Rippingale et al. | |
| 5,179,611 A | 1/1993 | Umeda et al. | |
| 5,206,065 A | 4/1993 | Rippingale et al. | |
| 5,305,405 A | 4/1994 | Emmons et al. | |
| 5,329,348 A | 7/1994 | Nimura et al. | |
| 5,333,228 A | 7/1994 | Kingstone | |
| 5,377,292 A | 12/1994 | Bartling et al. | |
| 5,394,496 A | 2/1995 | Caldwell et al. | |
| 5,395,362 A | 3/1995 | Sacharoff et al. | |
| 5,432,876 A | 7/1995 | Appeldorn et al. | |
| 5,463,706 A | 10/1995 | Dumont et al. | |
| 5,500,913 A | 3/1996 | Allen et al. | |
| 5,591,160 A | 1/1997 | Reynard | |
| 5,666,453 A | 9/1997 | Dannenmann | |
| 5,741,152 A | 4/1998 | Boutros | |
| 5,764,043 A | 6/1998 | Czosnowski et al. | |
| 5,835,654 A | 11/1998 | Bergmann | |
| 5,979,188 A | 11/1999 | Ojha | |
| 5,982,967 A | 11/1999 | Mathis et al. | |
| 6,126,325 A | 10/2000 | Yamane et al. | |
| 6,137,928 A * | 10/2000 | Albrecht ................. G02B 6/001 362/551 | |
| 6,137,935 A | 10/2000 | Bohme et al. | |
| 6,173,097 B1 | 1/2001 | Throckmorton et al. | |
| 6,257,750 B1 | 7/2001 | Strasser et al. | |
| 6,293,081 B1 | 9/2001 | Grulick et al. | |
| 6,301,418 B1 * | 10/2001 | Freier .................... G02B 6/001 362/558 | |
| 6,311,000 B1 | 10/2001 | Schneider | |
| 6,314,713 B1 | 11/2001 | Fitz et al. | |
| 6,317,553 B1 | 11/2001 | Harper, Jr. et al. | |
| 6,347,172 B1 | 2/2002 | Keller et al. | |
| 6,356,690 B1 | 3/2002 | McAlpine et al. | |
| 6,379,054 B2 | 4/2002 | Throckmorton et al. | |
| 6,388,194 B1 | 5/2002 | Ryeczek | |
| 6,403,947 B1 * | 6/2002 | Hoyt ................. H01L 21/67265 250/221 | |
| 6,425,694 B1 | 7/2002 | Szilagyi et al. | |
| 6,439,780 B1 | 8/2002 | Mudd et al. | |
| 6,456,768 B1 | 9/2002 | Boncek et al. | |
| 6,456,785 B1 | 9/2002 | Evans | |
| 6,471,412 B1 | 10/2002 | Belenkiy et al. | |
| 6,519,396 B2 | 2/2003 | Schneider et al. | |
| 6,526,200 B1 * | 2/2003 | Davie .................... G02B 6/001 362/559 | |
| 6,532,328 B1 | 3/2003 | Kline | |
| 6,554,485 B1 | 4/2003 | Beatty et al. | |
| 6,560,390 B2 | 5/2003 | Grulick et al. | |
| 6,577,243 B1 | 6/2003 | Dannenmann et al. | |
| 6,596,943 B1 | 7/2003 | Ward | |
| 6,606,431 B2 | 8/2003 | Unsworth | |
| 6,678,449 B2 | 1/2004 | Thompson et al. | |
| 6,695,491 B1 | 2/2004 | Leeman et al. | |
| 6,704,479 B2 | 3/2004 | Koplow | |
| 6,710,254 B2 | 3/2004 | Yueh | |
| 6,712,524 B2 | 3/2004 | Beatty et al. | |
| 6,728,453 B2 | 4/2004 | Petryszak | |
| 6,798,956 B2 | 9/2004 | Morrison | |
| 6,816,661 B1 | 11/2004 | Barnes et al. | |
| 6,823,120 B2 * | 11/2004 | Hurley ................. G02B 6/4482 385/112 | |
| 6,876,809 B1 | 4/2005 | Sonderegger et al. | |
| 6,906,505 B2 | 6/2005 | Brunet et al. | |
| 6,933,438 B1 | 8/2005 | Watts et al. | |
| 6,969,273 B2 | 11/2005 | Chen | |
| 6,979,223 B2 | 12/2005 | Chen | |
| 7,020,369 B2 * | 3/2006 | Lodge, Jr. ................. D04D 7/10 362/565 | |
| 7,029,137 B2 | 4/2006 | Lionetti et al. | |
| 7,038,135 B1 | 5/2006 | Chan et al. | |
| 7,049,937 B1 | 5/2006 | Zweig et al. | |
| 7,090,411 B2 | 8/2006 | Brown | |
| 7,121,707 B2 | 10/2006 | Currie et al. | |
| 7,164,819 B2 * | 1/2007 | Jenson ............... G02B 6/02033 385/39 | |
| 7,217,152 B1 | 5/2007 | Xin et al. | |
| 7,221,284 B2 | 5/2007 | Scherer et al. | |
| 7,242,831 B2 | 7/2007 | Fee | |
| 7,313,304 B2 | 12/2007 | Andrews et al. | |
| 7,401,961 B2 * | 7/2008 | Longatti ................... D04C 1/12 362/311.06 | |
| 7,406,231 B1 | 7/2008 | Beck et al. | |
| 7,433,565 B2 | 10/2008 | Joseph et al. | |
| 7,524,082 B2 | 4/2009 | North | |
| 7,544,909 B2 | 6/2009 | Dhir | |
| 7,572,066 B2 | 8/2009 | De Jong et al. | |
| 7,596,293 B2 | 9/2009 | Isenhour et al. | |
| 7,603,020 B1 | 10/2009 | Wakileh et al. | |
| 7,618,175 B1 * | 11/2009 | Hulse ..................... F21S 10/02 362/555 | |
| 7,620,279 B2 | 11/2009 | Joseph | |
| 7,653,277 B2 | 1/2010 | Andrews et al. | |
| 7,671,279 B2 | 3/2010 | Yin | |
| 7,748,860 B2 | 7/2010 | Brunet | |
| 7,817,884 B2 | 10/2010 | Demeritt et al. | |
| 7,920,764 B2 | 4/2011 | Kewitsch | |
| 7,932,805 B2 | 4/2011 | Darr et al. | |
| 7,948,226 B2 | 5/2011 | Rathbun, II et al. | |
| 8,000,576 B2 | 8/2011 | Chen et al. | |
| 8,102,169 B2 | 1/2012 | Law et al. | |
| 8,150,227 B2 | 4/2012 | Kewitsch | |
| 8,152,385 B2 | 4/2012 | De Jong et al. | |
| 8,167,471 B1 | 5/2012 | Moritz | |
| 8,314,603 B2 | 11/2012 | Russell | |
| 8,322,871 B1 | 12/2012 | Knaggs et al. | |
| 8,331,752 B2 | 12/2012 | Biribuze et al. | |
| 8,408,029 B2 | 4/2013 | De Angelis et al. | |
| 8,414,319 B2 | 4/2013 | Patel et al. | |
| 8,428,405 B2 | 4/2013 | Kewitsch | |
| 8,492,448 B2 | 7/2013 | Dewa et al. | |
| 8,509,579 B2 | 8/2013 | Martin-Lopez | |
| 8,545,076 B2 | 10/2013 | Bickham et al. | |
| 8,548,293 B2 | 10/2013 | Kachmar | |
| 8,582,939 B2 | 11/2013 | Gimblet et al. | |
| 8,582,940 B2 | 11/2013 | Abernathy et al. | |
| 8,591,087 B2 | 11/2013 | Bickham et al. | |
| 8,620,123 B2 | 12/2013 | Dean, Jr. et al. | |
| 8,620,125 B2 | 12/2013 | Button et al. | |
| 8,683,827 B2 | 4/2014 | De Angelis et al. | |
| 8,708,724 B2 | 4/2014 | Patel et al. | |
| 8,724,842 B2 | 5/2014 | Sumitani et al. | |

(56) References Cited

U.S. PATENT DOCUMENTS

| | | | |
|---|---|---|---|
| 8,724,942 B2 | 5/2014 | Logunov et al. | |
| 8,770,525 B2 | 7/2014 | Donaldson et al. | |
| 8,787,717 B2 | 7/2014 | Logunov | |
| 8,791,829 B2 * | 7/2014 | Gustafsson | G01R 13/0227 315/312 |
| 8,798,419 B2 | 8/2014 | Wessels, Jr. et al. | |
| 8,805,141 B2 * | 8/2014 | Fewkes | G02B 6/001 385/100 |
| 8,896,286 B2 | 11/2014 | Abuelsaad et al. | |
| 8,896,287 B2 | 11/2014 | Abuelsaad et al. | |
| 8,897,612 B2 | 11/2014 | Logunov | |
| 8,903,212 B2 | 12/2014 | Kachmar | |
| 8,909,013 B1 | 12/2014 | Jiang et al. | |
| 8,929,703 B2 * | 1/2015 | Logunov | G02B 6/0003 385/123 |
| 9,025,923 B2 | 5/2015 | Logunov et al. | |
| 9,073,243 B2 | 7/2015 | Gimblet et al. | |
| 9,146,347 B2 | 9/2015 | Logunov et al. | |
| 9,182,561 B2 | 11/2015 | Bauco et al. | |
| 9,196,975 B2 | 11/2015 | Scherer et al. | |
| 9,271,709 B2 | 3/2016 | Grey et al. | |
| 9,304,278 B1 | 4/2016 | Bauco et al. | |
| 9,388,975 B2 * | 7/2016 | Wenger | F21V 21/008 |
| 9,429,731 B2 | 8/2016 | Bookbinder et al. | |
| 9,435,713 B2 | 9/2016 | Collier et al. | |
| 9,448,380 B2 | 9/2016 | Mogensen | |
| 9,507,096 B2 | 11/2016 | Isenhour et al. | |
| 9,529,167 B2 * | 12/2016 | Wu | G02B 6/4401 |
| 9,541,694 B2 * | 1/2017 | Tissot | G02B 6/0003 |
| 9,671,551 B2 * | 6/2017 | Dean, Jr. | G02B 6/02033 |
| 9,709,750 B1 | 7/2017 | Kuang et al. | |
| 2001/0002220 A1 | 5/2001 | Trockmorton et al. | |
| 2001/0048797 A1 | 12/2001 | Van Dijk et al. | |
| 2002/0009282 A1 | 1/2002 | Grulick et al. | |
| 2002/0036775 A1 * | 3/2002 | Wolleschensky | G02B 21/0004 356/317 |
| 2002/0037133 A1 | 3/2002 | Unsworth | |
| 2002/0136497 A1 | 9/2002 | McGarry et al. | |
| 2002/0159735 A1 | 10/2002 | Edvold et al. | |
| 2002/0185299 A1 | 12/2002 | Giebel | |
| 2003/0002830 A1 | 1/2003 | Petryszak | |
| 2003/0016924 A1 | 1/2003 | Thompson et al. | |
| 2003/0108270 A1 | 6/2003 | Brimacombe et al. | |
| 2003/0206519 A1 | 11/2003 | Sanders et al. | |
| 2003/0222786 A1 | 12/2003 | Dannenmann et al. | |
| 2004/0022504 A1 | 2/2004 | Hurley et al. | |
| 2004/0052473 A1 | 3/2004 | Seo et al. | |
| 2004/0146254 A1 | 7/2004 | Morrison | |
| 2004/0160774 A1 | 8/2004 | Lionetti et al. | |
| 2004/0179777 A1 | 9/2004 | Buelow, II et al. | |
| 2004/0196648 A1 | 10/2004 | Franklin et al. | |
| 2005/0052174 A1 | 3/2005 | Angelo et al. | |
| 2005/0089284 A1 | 4/2005 | Ma | |
| 2005/0212503 A1 | 9/2005 | Deibele | |
| 2006/0104578 A1 | 5/2006 | Herbst | |
| 2006/0133750 A1 | 6/2006 | Lee | |
| 2006/0140562 A1 | 6/2006 | Joseph et al. | |
| 2006/0193575 A1 | 8/2006 | Greenwood et al. | |
| 2006/0232385 A1 | 10/2006 | Scherer et al. | |
| 2006/0285350 A1 * | 12/2006 | Wang | G02B 6/0008 362/555 |
| 2007/0116402 A1 | 5/2007 | Slade et al. | |
| 2007/0153508 A1 | 7/2007 | Nall et al. | |
| 2007/0217749 A1 | 9/2007 | Jong et al. | |
| 2008/0080820 A1 | 4/2008 | Andrews et al. | |
| 2008/0087082 A1 | 4/2008 | Andrews et al. | |
| 2008/0121171 A1 | 5/2008 | Hulsey | |
| 2008/0198618 A1 | 8/2008 | North | |
| 2008/0204235 A1 | 8/2008 | Cook | |
| 2008/0273844 A1 | 11/2008 | Kewitsch | |
| 2009/0027873 A1 | 1/2009 | Tarlton | |
| 2009/0297104 A1 | 12/2009 | Kachmar | |
| 2009/0299440 A9 | 12/2009 | Slatkine | |
| 2010/0021114 A1 | 1/2010 | Chen et al. | |
| 2010/0066254 A1 | 3/2010 | Ott et al. | |
| 2010/0148747 A1 | 6/2010 | Rathbun, II et al. | |
| 2010/0166374 A1 | 7/2010 | Lapp | |
| 2010/0274235 A1 | 10/2010 | Mihajlovic et al. | |
| 2011/0034068 A1 | 2/2011 | Russell | |
| 2011/0085776 A1 | 4/2011 | Biribuze et al. | |
| 2011/0103747 A1 | 5/2011 | Chang et al. | |
| 2011/0103757 A1 | 5/2011 | Alkemper et al. | |
| 2011/0122646 A1 | 5/2011 | Bickham et al. | |
| 2011/0150488 A1 | 6/2011 | Kewitsch | |
| 2011/0305035 A1 | 12/2011 | Bickham et al. | |
| 2012/0019900 A1 | 1/2012 | Kitson et al. | |
| 2012/0219259 A1 | 8/2012 | Kewitsch | |
| 2012/0275178 A1 | 11/2012 | Logunov | |
| 2012/0275180 A1 | 11/2012 | Button et al. | |
| 2012/0275745 A1 | 11/2012 | Logunov | |
| 2013/0021597 A1 | 1/2013 | Carlson, Jr. et al. | |
| 2013/0088888 A1 | 4/2013 | Fewkes et al. | |
| 2013/0107565 A1 | 5/2013 | Genier | |
| 2013/0201001 A1 | 8/2013 | Ratnakar | |
| 2013/0209045 A1 | 8/2013 | Dean, Jr. et al. | |
| 2013/0272014 A1 | 10/2013 | Logunov et al. | |
| 2013/0341922 A1 | 12/2013 | Jimenez Buendia | |
| 2014/0016904 A1 | 1/2014 | Kachmar | |
| 2014/0070639 A1 | 3/2014 | Tamura | |
| 2014/0221763 A1 | 8/2014 | Vayser et al. | |
| 2014/0227438 A1 | 8/2014 | Dean, Jr. et al. | |
| 2014/0270639 A1 | 9/2014 | James, III et al. | |
| 2014/0355295 A1 * | 12/2014 | Kuchinsky | G02B 6/001 362/558 |
| 2014/0363134 A1 | 12/2014 | Bookbinder et al. | |
| 2015/0043875 A1 | 2/2015 | Bookbinder et al. | |
| 2015/0049992 A1 | 2/2015 | Bauco | |
| 2015/0369986 A1 | 12/2015 | Logunov et al. | |
| 2016/0139353 A1 | 5/2016 | Bauco et al. | |
| 2016/0202418 A1 | 7/2016 | Fortin et al. | |
| 2016/0231521 A1 | 8/2016 | Smith et al. | |
| 2016/0313483 A1 | 10/2016 | Chomycz | |
| 2016/0313513 A1 | 10/2016 | Wijbrans et al. | |
| 2016/0377818 A1 | 12/2016 | Tong et al. | |
| 2017/0207585 A1 | 7/2017 | Butler et al. | |
| 2017/0293102 A1 | 10/2017 | Bauco et al. | |
| 2018/0128996 A1 | 5/2018 | Sawicki et al. | |

FOREIGN PATENT DOCUMENTS

| | | |
|---|---|---|
| CN | 102589728 A | 7/2012 |
| CN | 201305952 U | 7/2012 |
| CN | 203241575 U | 10/2013 |
| DE | 4413597 A1 | 10/1995 |
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 0874191 A2 | 10/1998 |
| EP | 0952589 A2 | 10/1999 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 59182404 A | 4/1983 |
| JP | 61139221 A | 6/1986 |
| JP | 61161827 U | 10/1986 |
| JP | 1990055506 A | 2/1990 |
| JP | 2108007 A | 4/1990 |
| JP | 2108008 A | 4/1990 |
| JP | 6017157 U | 3/1994 |
| JP | 06130253 A | 5/1994 |
| JP | 9178956 A | 7/1997 |
| JP | 9237524 A | 9/1997 |
| JP | 2008153030 A | 7/2008 |
| JP | 2009244288 A | 10/2009 |
| JP | 2010237233 A | 10/2010 |
| JP | 2013196960 A | 9/2013 |
| KR | 875507 B1 | 12/2008 |
| WO | 1998034144 A1 | 8/1998 |
| WO | 1999024856 A1 | 5/1999 |
| WO | 2000011484 A1 | 3/2000 |

(56) References Cited

FOREIGN PATENT DOCUMENTS

| | | | |
|---|---|---|---|
| WO | 2005106899 | A1 | 11/2005 |
| WO | 2006044177 | A2 | 4/2006 |
| WO | 2006113114 | A2 | 10/2006 |
| WO | 2007053371 | A1 | 5/2007 |
| WO | 2008048955 | A2 | 4/2008 |
| WO | 2010011299 | A2 | 1/2010 |
| WO | 2010021896 | A1 | 2/2010 |
| WO | 2011063214 | A1 | 5/2011 |
| WO | 2013055842 | A1 | 4/2013 |
| WO | 2013059811 | A1 | 4/2013 |
| WO | 2013122825 | A1 | 8/2013 |
| WO | 2014026300 | A1 | 2/2014 |
| WO | 2015000194 | A1 | 1/2015 |
| WO | 2016170172 | A1 | 10/2016 |

OTHER PUBLICATIONS

International Search Report and Written Opinion PCT/US2016/042414 dated Oct. 5, 2016.
U.S. Appl. No. 62/193,638, U.S. Appl. No. 62/221,769—Listed in ID as 26113.
U.S. Appl. No. 14/791,924, filed May 20, 2015.
U.S. Appl. No. 15/000,128, filed Jan. 19, 2016.
U.S. Appl. No. 15/054,380, filed Mar. 31, 2015.
U.S. Appl. No. 15/142,853, filed Apr. 29, 2016.
U.S. Appl. No. 62/193,638, filed Jul. 17, 2015.
U.S. Appl. No. 62/193,643, filed Jul. 17, 2015.
U.S. Appl. No. 62/221,769, filed Sep. 22, 2015.
U.S. Appl. No. 62/221,774, filed Sep. 22, 2015.
U.S. Appl. No. 62/248,490, filed Oct. 30, 2015.
International Search Report and Written Opinion PCT/US2016/020542 dated Jun. 7, 2016.
"Side Emitting Super Glowing Fiber," MeshTel.com. MeshTel-INTELITE, Inc., 1996-2012. Web. Aug. 1, 2013.
International Search Report and Written Opinion PCT/US2016/031624 dated Aug. 31, 2016.
http://www.dexim.net/list.php?id=7, Dexim product reference, downloaded from the web Feb. 24, 2016. 2 pages.
Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.
Fiber Optic Products, Inc., "Specifications of our Fiber and Cable," n.d. Retrieved on Aug. 9, 2013, 2 pages.
M. Rajesh, "Polymer Photonics: An Overview," Fabrication and Characterisation, 2011, 38 pages.
Schott, "SpectraStream Glass Harnesses," Rev. Nov. 2006, 2 pages.
Spigulis, J., "Side-Emitting Fibers Brighten Our World in New Ways," Oct. 2005, Retrieved from www.osa-opn.org, 6 pages.
Patent Cooperation Treaty, International Search Report, Application No. PCT/US2013/025262, Jul. 16, 2013, 7 pages.
"Super Vision Fiber Optics Side Glow Cables," TriN01ihLighting,com, Tri North Lighting, Inc., n.d., Web. Aug. 1, 2013.
U.S. Appl. No. 13/431,565, filed Mar. 27, 2012, David L. Dean, Jr., 32 pages.
European Search Report, Application No. 15168466.9-1553, Dec. 17, 2015, 9 pages.
Optical fiber with nanostructured cladding ofTi02 nanoparticles self-assembled onto a side polished fiber and its temperature sensing, Lu et al., Optics Express, vol. 22, No. 26, Dec. 29, 2014, 7 pages, downloaded from internet on Jan. 5, 2015.
Patent Cooperation Treaty, International Search Report for PCT/US2015/060558, dated Feb. 9, 2016, 5 pages.
Patent Cooperation Treaty International Search Report, Application No. PCT/US2014/049524, Jan. 20, 2015, 5 pages.
"Diode Lasers, Fiber Optics, IR, Red, Green, Blue Diode Lasers, Laser Diode, Fiber Illuminators, Fiber Optics, Coupler, Galvonarneters, Laser Show Acessories," Jan. 1, 2013, httn://www.meshtel.com/, 1 oage.
Patent Cooperation Treaty, International Search Report, PCT/US2014/049525, dated Jan. 23, 2015, 18 pages.
U.S. Appl. No. 14/295,844, Bookbinder filed Jun. 4, 2014, 25 pages.
Patent Cooperation Treaty, International Search Report and Written Opinion for International Application No. PCT/US2014/041510, dated Sep. 18, 2014, 10 pages.
International Searching Authority Invitation to Pay Additional Fees PCT/US2016/055497 dated Dec. 19, 2016.
International Searching Authority Invitation to Pay Additional Search Fees PCT/US2016/042416 dated Oct. 7, 2016.
International Search Report and Written Opinion PCT/US2017/012899 dated Mar. 9, 2017.
Endruweit et al. "Spectroscopic experiments regarding the effciency of side emission optical fibres in the UV-A and visible blue spectrum" Optics and Lasers in Engineering 46 (2008) pp. 97-105.

* cited by examiner

TRACEABLE OPTICAL FIBER CABLE AND FILTERED VIEWING DEVICE FOR ENHANCED TRACEABILITY

PRIORITY APPLICATION

This application claims the benefit of priority under 35 U.S.C. § 119 of U.S. Provisional Application Ser. No. 62/081,054, filed on Nov. 18, 2014, the content of which is relied upon and incorporated herein by reference in its entirety.

BACKGROUND

The disclosure relates generally to cables and more particularly to optical communication cables including an embedded element that emits light along the exterior of the cable. The disclosure also relates to light filtering viewing devices that enhance the visibility of the cable during tracing and to methods of tracing the path of such an optical communication cable within a group of cables.

Optical communication cables have seen increased use in a wide variety of electronics and telecommunications fields. Fiber optic cable assemblies may range in size and complexity from single-fiber jumpers to multi-fiber harnesses. These cable assemblies are typically used to interconnect equipment in high-speed networks, and within some high-speed networks, a large number of multiple individual cables (e.g., fiber optic patchcords) are used to interconnect various equipment, for example, within a telecommunications closet, server room, etc. As the needs of the network change or as repairs are needed, network operators frequently desire to change, move or replace cables with the network.

SUMMARY

One embodiment of the disclosure relates to a system for tracing an optical communication cable. The system includes a traceable optical communication cable. The traceable optical communication cable includes a cable body having a first end, a second end, an outer surface, an inner surface, and a channel defined by the inner surface and extending between the first end and the second end. The traceable optical communication cable includes an optical communication element located in the channel. The traceable optical communication cable includes an elongate light emitting element extending along at least a portion of the length of the cable body. The light emitting element is configured to emit light radially outward from the cable body, and the light emitted from the light emitting element has a wavelength range. The system includes a viewing device having a light filtering element configured to pass light within the wavelength length range through the light filtering element and to block at least a portion of light having wavelengths outside of the wavelength range.

Another embodiment of the disclosure relates to an optical communication cable for use with a system for tracing the optical communication cable. The optical communication cable includes a cable body including a first end, a second end, an outer surface, an inner surface, and a channel defined by the inner surface and extending between the first end and the second end. The optical communication cable includes an optical communication element located in the channel. The optical communication cable includes an elongate light emitting element extending along at least a portion of the length of the cable body configured to emit light along the length of the light emitting element, and light emitted from the light emitting element is visible from outside of the cable body. The optical communication cable includes a plurality of light transmitting windows spaced periodically along the length of the cable body and located in radial alignment with and radially outside of the light emitting element such that light emitted from the light emitting element is transmitted out of the cable body through the plurality of light transmitting windows. The cable body includes a plurality of opaque sections located between adjacent light transmitting windows along the length of the cable body, and the opaque sections include a fire-resistant polymer material.

An additional embodiment of the disclosure relates to a traceable optical communication cable. The traceable optical communication cable includes a cable body including a first end, a second end, an outer surface, an inner surface, and a channel defined by the inner surface and extending between the first end and the second end. The traceable optical communication cable includes an optical communication element located in the channel. The traceable optical communication cable includes an elongate light emitting element extending along at least a portion of the length of the cable body and embedded in the cable body below the outer surface and outside of the channel. The cable body includes a plurality of light transmitting windows spaced from each other along the length of the cable body and located in radial alignment with and radially outside of the light emitting element such that light emitted from the light emitting element is transmitted out of the cable body through the plurality of light transmitting windows. The cable body includes a plurality opaque sections located between adjacent light transmitting windows along the length of the cable body, and the opaque sections include a fire-resistant polymer material.

An additional embodiment of the disclosure relates to a method of tracing a path of a first cable within a group of cables. The method includes emitting light from an outer surface of the first cable along at least a portion of the length of the first cable, and the emitted light has a wavelength range. The method includes filtering light within the wavelength range from ambient light. The method includes detecting the filtered light to identify the first cable within the group of cables.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
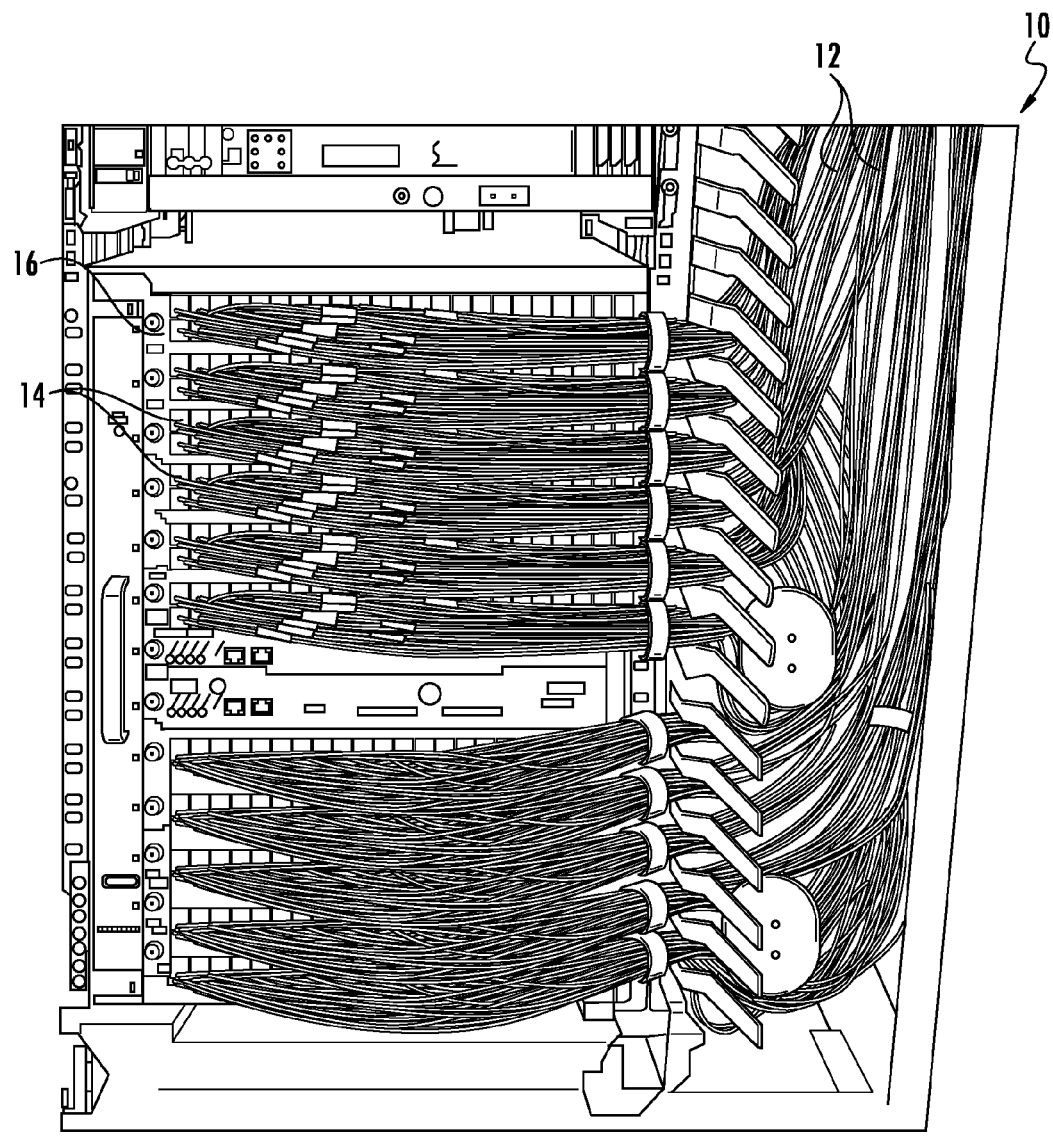
FIG. 1 is a perspective view of an equipment rack supporting fiber optic cables.

Referring generally to the figures, various embodiments of a system and method for tracing an optical communication cable and related traceable fiber optic cable are shown. In addition various embodiments of a cable, e.g., an optical communication cable, including an elongate light emitting element are shown. In various embodiments, the elongate light emitting element is a light diffusing optical fiber (LDF) or an electroluminescent wire (EL wire) that is located within the cable and runs substantially the entire length of the cable. The light emitting element, when connected to a light generating device that includes a light source (in the case of an LDF) or a power supply (in the case of an EL wire), emits light out from the cable along at least a portion of the cable. This emitted light allows a user, e.g., a network operator, to detect the light emitted along the length of the cable to identify a particular cable within groups or bundles of cables typical within many network installations. Because the light emitting element runs the entire length or substantially the entire length of the cable, the emitted light allows the entire length of the cable to be identified from the other cables within a group of cables allowing the network operator to more easily remove, repair, untangle, disconnect, etc. a particular cable from all of the other cables within the group.

In various embodiments, the light emitting element of the optical cable is configured to emit light with a relatively narrow and predetermined wavelength range. In various embodiments, the user may use a viewing device (such as glasses or a digital camera) that includes a light filtering element (e.g., a band-pass filter) that allows light within the wavelength range emitted from the light emitting element to pass through the filter while blocking at least some of the light (e.g., ambient light) that is outside of the wavelength range. This arrangement allows the user to more easily view the particular cable that has the energized light emitting element while using a relatively low powered power source to energize the light emitting element. Thus, by using the combination of a relatively narrow spectrum light emitting element and a light-filtering viewing device, identification of the desired optical cable is facilitated, even within brightly lit rooms or installations. In addition, this combination provides easy identification without the need to use high powered lasers or high current electrical power that may otherwise be needed to generate sufficient light to allow a traceable cable to be easily viewed in a bright environment.

In various embodiments, the light generating device when coupled to the light emitting element of the cable is configured to cause light to be emitted from the light emitting element in a way that improves the visibility of the light. For example, in some embodiments, the light generating device causes the light emitting element to emit light in a flashing or pulsing pattern. As compared to static illumination of a light emitting element, a flashing or pulsing pattern may further facilitate user identification of the cable having the illuminated light emitting element.

The light emitting element may be structured and arranged within the cable to provide good viewability. For example, the body of the cable may include a plurality of light transmitting (e.g., transparent, translucent, etc.) windows positioned to the exterior of the light emitting element. The windows allow light from the light emitting element to be visible from outside of the cable. In some embodiments, the light emitting element extends in a helical pattern within the cable body, and the windows are rings of clear material extending around the cable jacket. Additionally, in some embodiments, opaque sections of fire-resistant polymer material of the cable body are located between each window section. Because many translucent/transparent polymers are not fire-resistant, the fire-resistant polymer sections between each window limits the ability of flame to propagate down the length of the cable.

In many network environments, large numbers of cables are interconnected to a variety of communications or electronic equipment resulting in congestion that can make tracing the length of a particular cable difficult. In some network environments, cables (e.g., fiber optic patchcords) may be relatively long (e.g., between about 2 meters and 30 meters in length) such that identifying the ends and the length of a particular cable to be moved or replaced may be a labor intensive task typically involving two workers incrementally and manually tracing a particular cable from one end to the other. Thus, the cable embodiments of the present disclosure provide systems and methods that allow the identification of both ends of a cable and/or to also trace the length of the cable without the need for high powered illuminating tracing systems.

Figure 2:
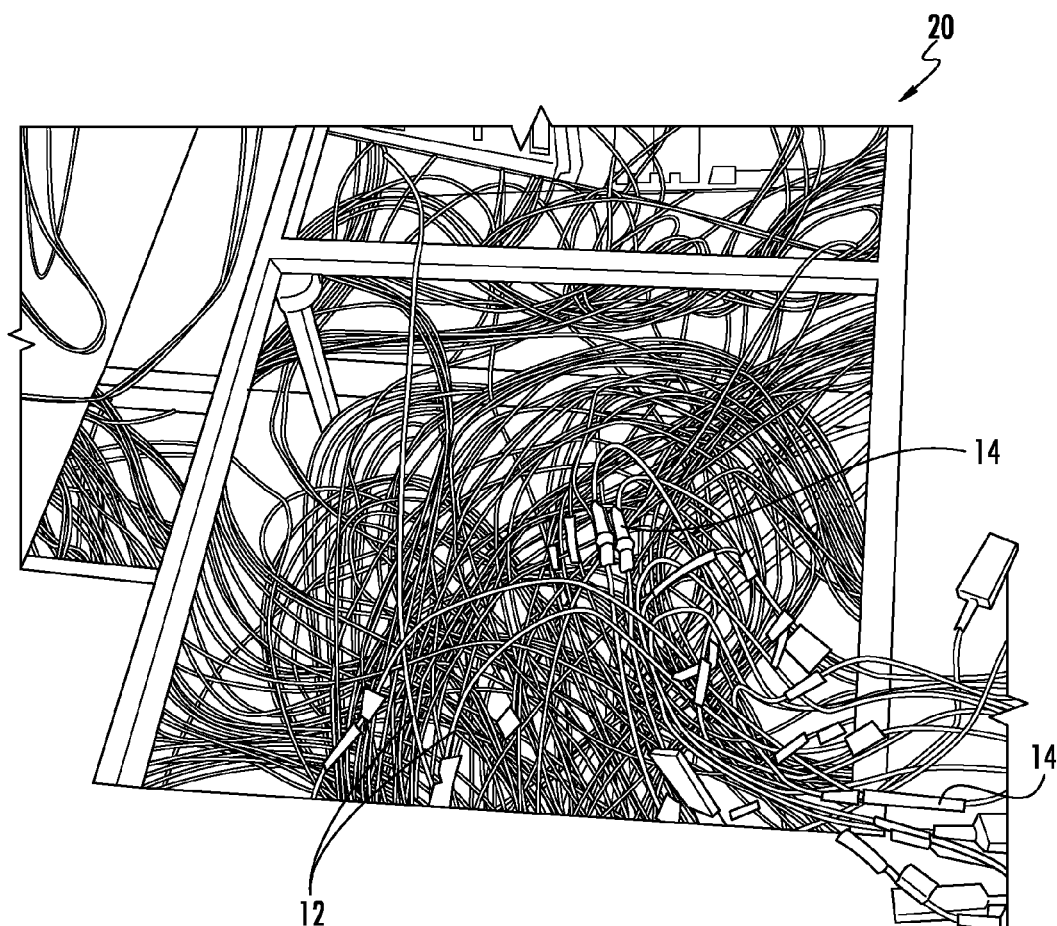
FIG. 2 is a perspective view of an under-floor cable tray supporting fiber optic cables.

FIG. 1 shows an equipment rack 10, and a large number of cables, shown as fiber optic cables 12. FIG. 2 shows bundles of fiber optic cables 12 located in an under-floor cable tray 20. In both FIG. 1 and FIG. 2, fiber optic cables 12 include connectors 14 located at the ends of the cables. In FIG. 1, connectors 14 are shown attached to hardware, such as servers 16 supported by equipment rack 10, and in FIG. 2, connectors 14 are shown interconnecting cables 12 with other fiber optic cables. Fiber optic cables 12 may be legs of larger cable assemblies, such as harness cable assemblies or jumper cables extending from a furcation body coupled to a trunk cable. In other embodiments, cables 12 may be patchcords, e.g., fiber optic cables including one or more optical fiber, a cable body, and connectors on each end of the cable, to interconnect equipment within a network installation.

As can be seen in the exemplary network environments of FIG. 1 and FIG. 2, cables 12 can become congested making identification of the ends and the length of a particular fiber optic cable 12 difficult. The network operator may need to identify a particular optical fiber for a number of reasons, such as to replace a broken or malfunctioning cable, to move or add cables to accommodate changes in the network, to install new hardware, etc. Such identification may be particularly difficult in fiber optic network installations because of the relatively small diameter of the typical fiber optic cable (e.g., a fiber optic patchcord may have an outer diameter of about 2 mm or less).

Accordingly, to facilitate such activities, the tracing system and method and related cable embodiments discussed herein include a light emitting element that allows for identification of both ends of a particular cable as well as the length of the cable body. In particular, the light emitting element is configured to emit light along the length of a selected cable 12 within the group of cables, for example by coupling a light generating device to one end of the light emitting element. The light emitting element, once energized by the light generating device, emits light along the length of the cable. The user then views the cable emitting light allowing the path of the particular cable to be traced. In various embodiments discussed herein, the system includes a viewing device including a spectral filter that the user uses to view the illuminated cable such that background or ambient light is reduced, thereby enhancing the detectability of the illuminated cable. It should be understood that while the embodiments discussed herein relate primarily to fiber optic cables, in other embodiments, the light emitting element and cable tracing systems and methods discussed herein can be applied to other types of cables or conduits, such as electrical-communication wires, power lines, hydraulic-fluid lines, etc.

Figure 3:
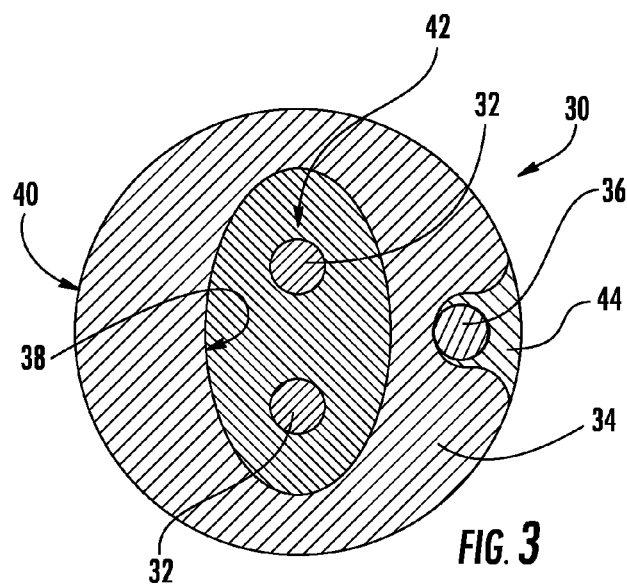
FIG. 3 is a cross-sectional view of a traceable optical fiber cable according to an exemplary embodiment.
Figure 4:
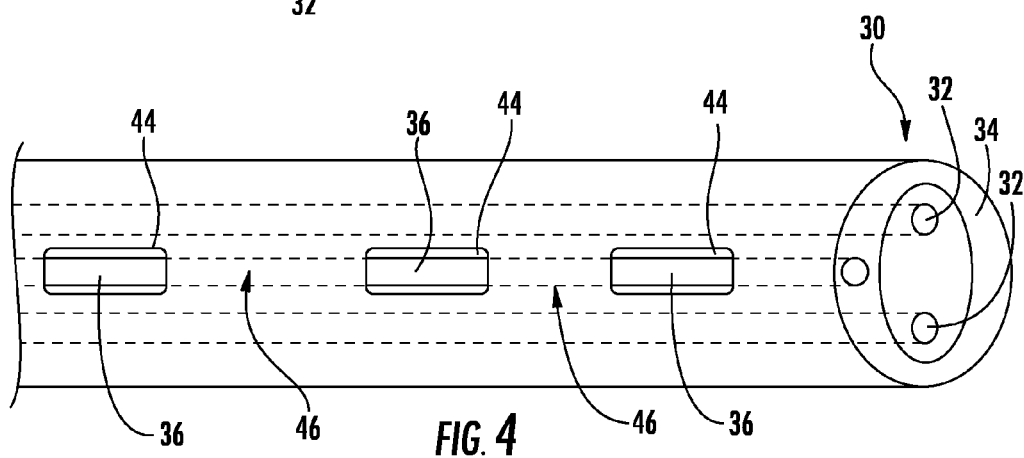
FIG. 4 is a side view of the traceable optical fiber cable of FIG. 3 according to an exemplary embodiment.

Referring to FIG. 3 and FIG. 4, a fiber optic cable 30 ("cable 30") is shown according to an exemplary embodiment. It should be understood that one or more cables 12 as shown in FIG. 1 and FIG. 2 may be configured as cable 30. Cable 30 includes one or more optical communication elements, shown as optical fibers 32, located within a cable body, shown as cable jacket 34. Cable 30 also includes a light emitting element 36. In various embodiments, light emitting element 36 may be a light diffusing optical fiber (LDF), a plastic optical fiber (POF), an electroluminescent wire (EL wire), or other suitable light emitting element. Optical fibers 32 may be tight-buffered optical fibers having one or more outer protective layers (e.g., polymer layers) surrounding optical fiber 32, which itself comprises a glass core, a glass cladding surrounding the glass core but having a higher refractive index, and an outer coating (e.g., an acrylic layer). In other embodiments, optical fibers 32 may be one of a plurality of glass optical fibers in a loose-tube arrangement, or alternatively, optical fibers 32 may be one of several glass optical fibers arranged in parallel within an optical fiber ribbon. In some embodiments, optical fibers 32 may be multi-core optical fibers. In other embodiments, a cable as disclosed herein may contain data transmission elements other than one or more optical fibers, such as copper wires, or other media.

Cable jacket 34 includes an inner surface 38 and an outer surface 40. Inner surface 38 defines a channel, shown as central cavity 42, and in the embodiment shown, outer surface 40 defines the exterior surface of cable 30. In the embodiment of FIG. 3, optical fibers 32 are located in central cavity 42, and in some embodiments, cable 30 may include one or more tensile strength elements, such as aramid yarn strands located within central cavity 42.

In various embodiments, cable jacket 34 may have a thickness between 0.3 mm and 5.0 mm. For example, the outer diameter of cable jacket 34 may be about 2 mm (e.g., 2 mm plus or minus 0.1 mm). In general, cable jacket 34 provides structure and protection to optical fibers 32 during and after installation. Cable jacket 34 may be formed from an extruded polymer material, and/or may include multiple layers of materials where the outermost layer defines outer surface 40 of cable jacket 34. Further, cable 30 may include one or more strengthening members embedded within the material of cable jacket 34 or located within cavity 42. For example, cable 30 may include an elongate strengthening member (e.g., a fiber or rod) located within cavity 42 and running the length of cable jacket 34, and that is formed from a material that is more rigid than the material of cable jacket 34. The strengthening members may be metal, braided steel, glass reinforced plastic, fiber glass, fiber glass yarns or other suitable material. In various embodiments, cable 30 may include a variety of other elements embedded in or surrounded by cable jacket 34 depending on the intended use of a particular cable 30, including armor layers, moisture barrier layers, rip cords, etc. Additionally, cable 30 may include other components such as steel armor and stranded and/or longitudinal strength elements. Cable 30 may be stranded, loose tube core cable construction, or other fiber optic cable construction.

In general, cable 30 is constructed such that light generated by light emitting element 36 is visible from the outside of cable 30. In the embodiment shown in FIGS. 3 and 4, a plurality of light transmitting windows 44 (e.g., translucent or transparent windows) are located radially between light emitting element 36 and outer surface 40 of cable 30. As shown in FIG. 4, cable 30 includes a plurality of light transmitting windows 44 spaced along the length of cable 30 that generally follow the path of light emitting element 36 within cable 30. Additionally, the material of light transmitting windows 44 defines the portion of outer surface 40 radially outside of light emitting element 36 and also extends from outer surface 40 radially inward to light emitting element 36, but does not extend all of the way through cable jacket 34 to cavity 42. In another embodiment, the material of light transmitting window does extend all of the way through the cable jacket between cavity 42 and outer surface 40. In these arrangements, the material of light transmitting windows defines a light transmitting path from the light emitting element 36 radially to the exterior of cable 30 such that light emitted from light emitting element 36 is visible from outside of cable 30.

Referring to FIG. 4, opaque sections 46 of cable body 34 are located between adjacent windows 44. In various embodiments, the majority of cable body 34, including opaque sections 46, are formed from one or more fire-resistant polymer material. Some clear plastic materials, such as that used to form windows 44, tend to have relatively low fire-resistant characteristics. Thus, opaque sections 46 provide sections of fire-resistant material located between adjacent windows 44 limiting the ability of a flame from spreading along the length of cable 30 by burning the materials of windows 44.

In various embodiments, the fire-resistant polymer material of cable body 34 and the light transmitting material of windows 44 are coextruded polymer materials. In such embodiments, cable body 34 and windows 44 are extruded around light emitting element 36 such that light emitting element 36 is embedded within cable body 34 and within windows 44. Windows 44 may be formed from a PVC material, and the rest of cable body 34 may be formed from a fire-resistant polymer material, such as fire-resistant PVC, medium density polyethylene, polypropylene, etc. Additionally, the fire-resistant polymer material of the majority of cable body 34 and of opaque sections 46 are an extrudable polymer material that includes one or more material, additive or component embedded in the polymer material that provides fire-resistant characteristics, such as relatively low heat generation, low heat propagation, low flame propagation, and low smoke production. The fire resistant material may include an intumescent material additive embedded in the polymer material. Alternatively, the fire resistant material includes a non-intumescent fire resistant material embedded in the polymer material, such as a metal hydroxide, aluminum hydroxide, magnesium hydroxide, etc., that produces water in the presence of heat/fire which slows or limits heat transfer through or along cable 30. In specific embodiments, the fire resistant material may be a low smoke zero halogen polymer material.

Windows 44 are sized and shaped to allow a sufficient amount of light to be seen from light emitting element 36. In addition, in some embodiments, the lengths of opaque sections 46 are sufficiently large to provide the fire resistance functionality noted above, while at the same time providing enough window area that the light from light emitting element 36 is visible.

In the embodiment shown in FIG. 4, a single light emitting element 36 extends along the length of the cable substantially parallel to cavity 42 and/or optical fibers 32. In other embodiments, cable 30 may include multiple light emitting elements 36 each located at a different circumferential position within cable body 34, and each light emitting element 36 may include its own set of windows 44 that extend along the length of the light emitting element. For example, in one embodiment, cable 30 includes three light emitting elements 36, each spaced approximately 120 degrees around cable body 34 from the adjacent light emitting element 34. In another embodiment, light emitting element 36 extends helically along the length of cable body 34, and, in this embodiment, windows 44 are spaced rings of the clear material extending circumferentially around cable body 34.

Figure 5:
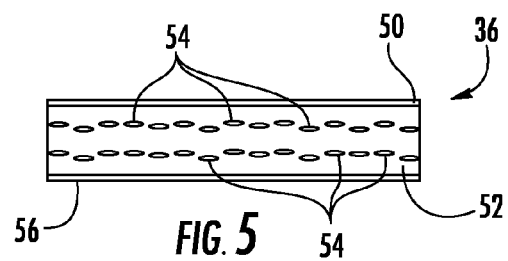
FIG. 5 is a cross-sectional view of a light emitting element for a traceable fiber optic cable according to an exemplary embodiment.

Referring to FIG. 5, light emitting element 36 is shown as a light diffusing optical fiber (LDF) 50 according to an exemplary embodiment. LDF 50 includes a fiber body 52, which may be formed from a UV fused silica material. LDF 50 also includes a plurality of scattering sites 54 located periodically along the length of LDF 50 and a clear exterior buffer coating 56. Scattering sites 54 scatter light from within LDF 50 such that some light passes out of fiber body 52 illuminating LDF 50. In various embodiments, LDF 50 is a relatively small diameter optical fiber. For example, the outer diameter of LDF 50 may be between 150 micrometers and 200 micrometers, and more specifically may be about 170 micrometers (e.g., 170 micrometers plus or minus 1%). In such embodiments, the small diameter of LDF 50 allows cable 30 to incorporate a light emitting element without the need to substantially increase the outer diameter of the cable jacket.

In another embodiment, light emitting element 36 is an electroluminescent wire (EL wire) that emits light when coupled to an electric power supply, typically an alternating current power supply. In various embodiments, the EL wire includes a conductor (e.g., a copper wire) surrounded by a phosphor material which emits light when current is delivered to the conductor. An outer colored layer of translucent plastic material may be used to control the color of light generated by the EL wire.

Figure 6:
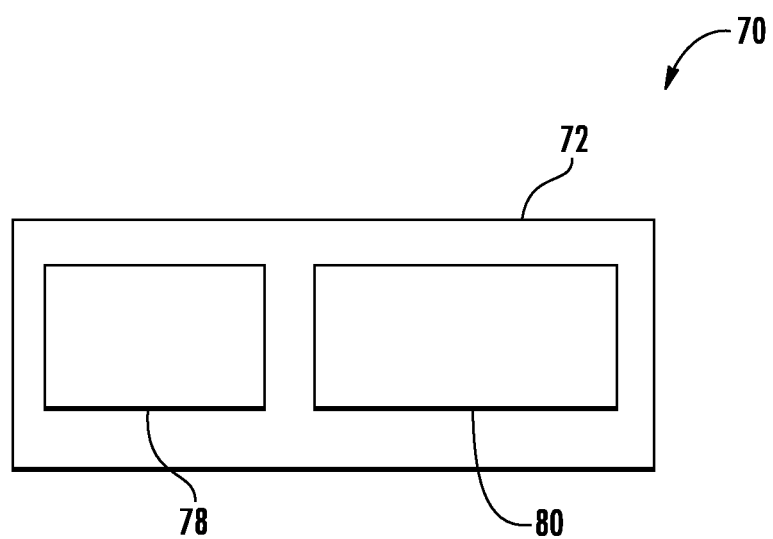
FIG. 6 is a block diagram of the tracing tool according to an exemplary embodiment.
Figure 7:
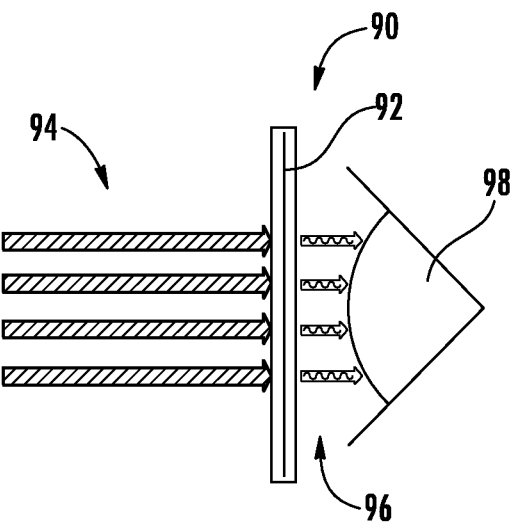
FIG. 7 is a schematic view of a viewing device that facilitates detection of the light emitted from a traceable fiber optic cable according to an exemplary embodiment.
Figure 8:
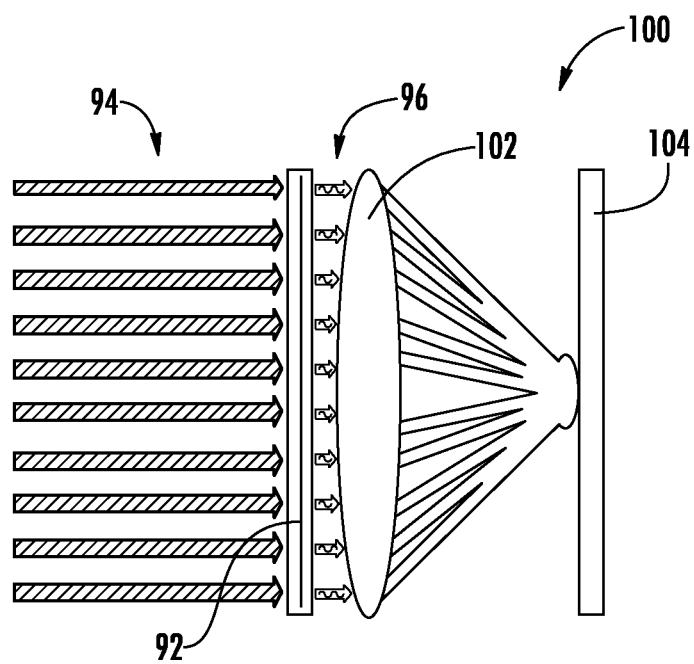
FIG. 8 is a schematic view of a viewing device that facilitates detection of the light emitted from a traceable fiber optic cable according to another exemplary embodiment.

Referring generally to FIGS. 6-8, components of a system for tracing an optical communication cable, such as cable 30 is shown. Referring to FIG. 6, the system for tracing an optical communication cable includes a tracing light generating device, shown as tracing tool 70 according to an exemplary embodiment. In general, tracing tool 70 includes a housing 72 that includes the various electronics and power supplies needed to cause light emitting element 36 to emit light as discussed above. FIG. 6 shows a block diagram of tracing tool 70. In one embodiment, tracing tool 70 may include a power supply 78 (e.g., one or more batteries) and light generating control system 80. In general, light generating control system 80 includes hardware and/or software configured to cause light emitting element 36 to emit light under the control of tracing tool 70. Further, tracing tool 70 general may include a structure configured to couple tracing tool 70 to light emitting element 36 such that tracing tool 70 causes light emitting element 36 to emit light as discussed above Light generating control system 80 will typically be configured based on the type of light emitting element 36 carried by cables 30 within a particular network installation. In embodiments in which light emitting element 36 is an LDF, light generating control system 80 includes a laser that generates light with a desired wavelength range and is configured to direct laser light from the laser of tracing tool 70 into light emitting element 36. As explained above, as the laser light travels down the LDF, portions of light are emitted outward from the LDF by interaction with scattering sites 54, such that light emitting element 36 is illuminated along the length of cable 30.

A wide variety of laser types and colors may be used within tracing tool 70. For example, the laser of tracing tool 70 may generate light within a selected wavelength range, such as at about 445 nm (e.g., 445 nm plus or minus 2 nm), at about 520 nm (e.g., 520 nm plus or minus 2 nm), at about 532 nm (e.g., 532 nm plus or minus 2 nm) or between 615 nm and 660 nm. In various embodiments, the laser of tracing tool 70 generates light in the green portion of the visual spectrum because green light may provide for better detected contrast within the typical network installation. In one embodiment, the laser of tracing tool 70 is a diode pumped solid state laser having a wavelength of between 530 nm and 534 nm, and more specifically of about 532 nm (e.g., 532 nm plus or minus 1 nm). It should be understood that in various other embodiments, the laser of tracing tool 70 may include lasers of any wavelength available today or in the future.

As will be understood, because portions of laser light exit LDF 50 along the length of the LDF to provide illumination, the brightness of emitted light tends to decrease along the length of the LDF. Tracing tool 70 and LDF 50 may be configured to limit the decrease in light brightness along the length of cable 30. In various embodiments, tracing tool 70 and LDF 50 are configured such that the decrease in light brightness along the length of cable 30 is less than 4×, specifically is between 1.5× and 2.5×, or even more specifically is less than 2×.

In embodiments in which light emitting element 36 is an EL wire, light generating control system 80 includes a circuit that generates an alternating current sufficient to cause excitation of the EL wire, and in this embodiment, tracing tool 70 includes an electrical conductor that provides the alternating current into light emitting element 36. As explained above, as the EL wire is excited by the alternating current the wire generates light having a color determined by the structure of the EL wire.

Regardless of whether light emitting element 36 is an LDF or EL wire, light generating control system 80 may be configured to enhance the visibility/detectability of light emitted from light emitting element 36. In one embodiment, light generating control system 80 is configured to pulse the light emitted by light emitting element 36. In various embodiments, light generating control system 80 causes light to pulse with a frequency between 1 Hz and 40 Hz, and more specifically between 1 Hz and 30 Hz. It is believed that pulsing the light in this manner may facilitate detection of the illuminated light emitted from element 36, particularly within brightly lit network installations.

Referring to FIG. 7 and FIG. 8, the system for tracing an optical communication cable includes a viewing device that facilitates viewing or detection of the light emitted from light emitting element 36. Referring to FIG. 7, in one embodiment, the viewing device is a direct viewing device, such as glasses, shown schematically as glasses 90, having a light filtering element 92 located within or in front of the lenses of glasses 90. In general, filtering element 92 is a spectral, band-pass filter that filters broad spectrum incoming light 94 by blocking a portion of light outside of the filter wavelength range and passing light within the filter wavelength range. In this arrangement, the filter wavelength of filter element 92 is selected such that the wavelength of light emitted from light emitting element 36 falls within the pass band wavelength of the filter, and thus, outgoing light 96 that reaches the eyes of the user 98 includes a greater proportion of light emitted from light emitting element 36 than before filtering. In this manner, filtering enhances the visibility of the cable 30 with the activated light emitting element 36.

In addition, by filtering incoming light 94 to increase the proportion of light emitted from light emitting element 36 that reaches the viewer, lower power consumption and generally safer tracing tools 70 may be used. For example, by using filtering element 92, tool 70 may be equipped with a lower powered laser or LED (in the case of LDF-based cable) or a lower powered AC current source (in the case of EL wire-based cable).

Filtering element 92 may be selected such that the band-pass wavelength of the filter surrounds the emission wavelength of light emitting element 36 of cable 30. In various embodiments, the band-pass wavelength of filtering element 92 is selected to be within 1 nm to 50 nm of the target emission wavelength of light emitting element 36. For example, the band-pass wavelength of filtering element 92 may be selected to be plus or minus 10 nm around the target emission wavelength of light emitting element 36, and more specifically to be plus or minus 5 nm around the target emission wavelength of light emitting element 36. Thus, in various embodiments, filtering element 92 has a band-pass wavelength between 435 nm and 455 nm and more specifically between 440 nm and 450 nm. In other embodiments, filtering element 92 has a band-pass wavelength between 510 nm and 530 nm and more specifically between 515 nm and 525 nm. In other embodiments, filtering element 92 has a band-pass wavelength between 522 nm and 542 nm and more specifically between 527 nm and 537 nm. In other embodiments, filtering element 92 has a band-pass wavelength of plus or minus 10 nm centered around a wavelength between 615 nm and 660 nm and more specifically, a band-pass wavelength of plus or minus 5 nm centered around a wavelength between 615 nm and 660 nm.

In various embodiments, filtering element 92 used with glasses 90 attenuates light outside of the band-pass wavelength to a degree that allows the wearer to safely navigate the network installation. In various embodiments, the system for tracing an optical communication cable includes a number of different glasses 90 and filters 92 with different attenuation levels allowing the user to select a level of background light attenuation that they are comfortable with.

Referring to FIG. 8, in one embodiment, the viewing device of the tracing system is an indirect viewing device, such as a digital detection device shown schematically as digital camera 100. In this embodiment, camera 100 includes a filtering element 92 located in front of lens 102, such that incoming light 94 is filtered prior to passing into lens 102 and interacting with a digital imaging device 104. In this embodiment, the user may then view the output of the digital camera (e.g., video output) to locate the desired cable 30. In various embodiments, camera 100 may be a CCD or CMOS camera. In one embodiment, when filter element 92 is used with camera 100, the attenuation of background light outside of the band-pass wavelength range is between 3-40 dB.

In various embodiments, the digital detection device may be configured to further facilitate detection of light emitting element 36. In one embodiment in which tool 70 is configured to pulse the light emitted from light emitting element 36, the digital detection device may be configured with hardware and/or software to detect the pulse frequency of the pulsed light. In various such embodiments, the digital detection device is configured to emit an alert, such as auditory alert, when the pulsing object enters the device's field of view. In other embodiments, the digital detection device is configured to enhance the display of the pulsed light on the digital device. Similarly, the digital detection device may be configured with hardware and/or software to detect the light within the emission wavelength and to enhance the display of the objects emitting light in that wavelength on the digital device. For example, in one embodiment, the digital detection device is configured to eliminate frames captured between light pulses from light emitting element 36 to improve the signal to noise ratio of the images displayed.

In some embodiments, in which an electronic viewer, such as camera 100, is used, light emitting element 36 may be configured to emit non-visual spectrum light, such as infrared. In such embodiments, camera 100 includes a sensor configured to detect infrared light, and filter element 92 of is selected to pass the emitted IR, or other non-visual light, wavelength.

The present disclosure also relates to a method of tracing the path of a first cable within a group of cables. The method includes the step of emitting light from an outer surface of the first cable along at least a portion of the length of the first cable, and the emitted light is emitted within a predetermined wavelength range. In various embodiments, emitting light occurs via a light emitting element, such as light emitting element 36, and a tracing light generating tool, such as tool 70, as discussed above. The method includes the step of filtering light within the wavelength range from ambient light. In various embodiments, filtering occurs via a filtering element, such as filtering element 92, discussed above. The method also includes detecting the filtered light to identify the first cable within the group of cables. In various embodiments, the detecting occurs by viewing the filtered light through a direct viewing device, such as glasses 90, or through an indirect viewing device, such as digital camera 100.

In various embodiments, the emitting light step includes generating laser light within the wavelength range and providing the laser light into a light diffusing optical fiber embedded within a cable body of the first cable. In other embodiments, the emitting light step includes supplying electrical power to an electroluminescent wire embedded within a cable body of the first cable such that the powered electroluminescent wire generates the light within the wavelength range. In various embodiments, the filtering step includes using glasses including a band-pass filter that passes a greater amount of light within the wavelength range than light outside of the wavelength range, and the detecting step includes viewing the first cable and the emitted light through the glasses. In other embodiments, the filtering step includes imaging the cable with a digital camera that includes a band-pass filter that passes a greater amount of light within the wavelength range than light outside of the wavelength range, and the detecting step includes viewing the first cable and the emitted light through the digital camera.

In various embodiments, cable jackets discussed herein, e.g., cable jacket 34, may be a variety of materials used in cable manufacturing such as medium-density polyethylene, polyvinyl chloride (PVC), polyvinylidene difluoride (PVDF), nylon, polyester or polycarbonate and their copolymers. In addition, the material of cable jacket 34 may include small quantities of other materials or fillers that provide different properties to the material of cable jacket 34. For example, the material of cable jacket 34 may include materials that provide for coloring, UV/light blocking (e.g., carbon black), burn resistance, etc.

The optical communication fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In various embodiments, the optical fibers discussed herein are CLEARCURVE® single or multi-mode fibers produced by Corning Incorporated, or other commercially-available optical fibers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. For example, as will be understood by those of ordinary skill in the art, features and attributes associated with embodiments shown in one of the Figures may be applied to embodiments shown in others of the Figures. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A system for tracing an optical communication cable, the system comprising:
    a traceable optical communication cable comprising:
        a cable body including a first end, a second end, an outer surface, an inner surface, and a channel defined by the inner surface and extending a length between the first end and the second end;
        an optical communication element located in the channel; and
        an elongate light emitting element extending along at least a portion of the length of the cable body, wherein the cable body comprises a plurality of light transmitting windows spaced periodically along the length of the cable body, wherein the light emitting element passes through the plurality of light transmitting windows, wherein the cable body includes a plurality of opaque sections located between adjacent light transmitting windows, wherein the light emitting element passes through the plurality of opaque sections, wherein the plurality of light transmitting windows are formed from a light transmitting polymer material; and
    a viewing device having a light filtering element configured to pass light within a wavelength range through the light filtering element and to block at least a portion of light having wavelengths outside of the wavelength range.

2. The system of claim 1 further comprising a tracing light generating device configured to be coupled to the light emitting element and to energize the light emitting element causing light to be emitted from the light emitting element.

3. The system of claim 2 wherein the light emitting element is a light diffusing optical fiber and the tracing light generating device includes a laser generating light in the wavelength range.

4. The system of claim 3 wherein the laser is configured to generate light having a wavelength range of at least one of 443 nm to 447 nm, 518 nm to 522 nm, 530 nm to 534 nm, or 615 nm to 660 nm, and the light filtering element is a band-pass filter configured to pass light having a wavelength within plus or minus 5 nm of the wavelength range.

5. The system of claim 2 wherein the light emitting element is an electroluminescent wire and the tracing light generating device includes an electrical power supply configured to supply current to the electroluminescent wire.

6. The system of claim 2 wherein the tracing light generating device is configured to power the light emitting element such that the light emitted from the light emitting element is emitted in a pulsating pattern.

7. The system of claim 1 wherein the viewing device includes glasses including the light filtering element.

8. The system of claim 1 wherein the viewing device includes a digital camera including the light filtering element.

9. The system of claim 1 wherein the plurality of light transmitting windows comprise spaced rings extending circumferentially around the cable body.

10. The system of claim 1 wherein the cable body comprises a cable jacket and the plurality of light transmitting windows extend from an outer surface of the cable jacket partially through the cable jacket.

11. The system of claim 1 wherein:
    the plurality of light transmitting windows comprise spaced rings extending circumferentially around the cable body; and
    the cable body comprises a cable jacket and the plurality of light transmitting windows extend from an outer surface of the cable jacket partially through the cable jacket.

12. An optical communication cable for use with a system for tracing the optical communication cable comprising:

a cable body including a first end, a second end, an outer surface, an inner surface, and a channel defined by the inner surface and extending a length between the first end and the second end;

an optical communication element located in the channel;

an elongate light emitting element extending along at least a portion of the length of the cable body; and a plurality of light transmitting windows spaced periodically along the length of the cable body, wherein the light emitting element passes through the plurality of light transmitting windows, wherein the cable body includes a plurality of opaque sections located between adjacent light transmitting windows, wherein the light emitting element passes through the plurality of opaque sections, wherein the plurality of light transmitting windows are formed from a light transmitting polymer material.

13. The optical communication cable of claim 12 further comprising a first optical connector coupled to the first end of the cable body and a second optical connector coupled to the second end of the cable body.

14. The optical communication cable of claim 12 wherein the light emitting element extends helically along the length of the cable body.

15. The optical communication cable of claim 12 wherein the light emitting element is a light diffusing optical fiber.

16. The optical communication cable of claim 12 wherein the light emitting element is an electroluminescent wire.

17. A traceable optical communication cable comprising:

a cable body including a first end, a second end, an outer surface, an inner surface, and a channel defined by the inner surface and extending a length between the first end and the second end;

an optical communication element located in the channel; and an elongate light emitting element extending along at least a portion of the length of the cable body and embedded in the cable body between the inner surface and the outer surface of the cable body;

wherein the cable body includes a plurality of light transmitting windows spaced from each other along the length of the cable body, wherein the light emitting element passes through the plurality of light transmitting windows;

wherein the cable body includes a plurality of opaque sections located between adjacent light transmitting sections, wherein the light emitting element passes through the plurality of opaque sections, and wherein the plurality of light transmitting windows are formed from a light transmitting polymer material.

18. The optical communication cable of claim 17, wherein the light emitting element extends helically along the length of the cable body.

19. A method of tracing a path of a first cable within a group of cables comprising:

emitting light from an outer surface of a cable body of the first cable along at least a portion of a length of the first cable, wherein the emitted light has a wavelength range, wherein the cable body comprises a first end, a second end, the outer surface, an inner surface, and a channel defined by the inner surface and extending the length between the first end and the second end, wherein the cable body comprises a plurality of light transmitting windows spaced periodically along the length of the cable body, wherein a light emitting element passes through the plurality of light transmitting windows such that the light emitted from the outer surface of the cable body is transmitted out of the cable body through the plurality of light transmitting windows, wherein the cable body includes a plurality of opaque sections located between adjacent light transmitting windows, wherein the light emitting element passes through the plurality of opaque sections, wherein the plurality of light transmitting windows are formed from a light transmitting polymer material;

filtering light within the wavelength range from ambient light; and detecting the filtered light to identify the first cable within the group of cables.

20. The method of claim 19 wherein the emitting light step includes generating laser light within the wavelength range, and providing the laser light into a light diffusing optical fiber embedded within the cable body of the first cable.

21. The method of claim 19 wherein the emitting light step includes supplying electrical power to an electroluminescent wire embedded within the cable body of the first cable, wherein the powered electroluminescent wire generates the light within the wavelength range.

22. The method of claim 19 wherein the filtering step includes using glasses including a band-pass filter that passes a greater amount of light within the wavelength range than light outside of the wavelength range, and the detecting step includes viewing the first cable and the emitted light through the glasses.

23. The method of claim 19 wherein the filtering step includes imaging the cable body with a digital camera that includes a band-pass filter that passes a greater amount of light within the wavelength range than light outside of the wavelength range, and the detecting step includes viewing the first cable and the emitted light through the digital camera.

* * * * *